United States Patent Office 3,746,668
Patented July 17, 1973

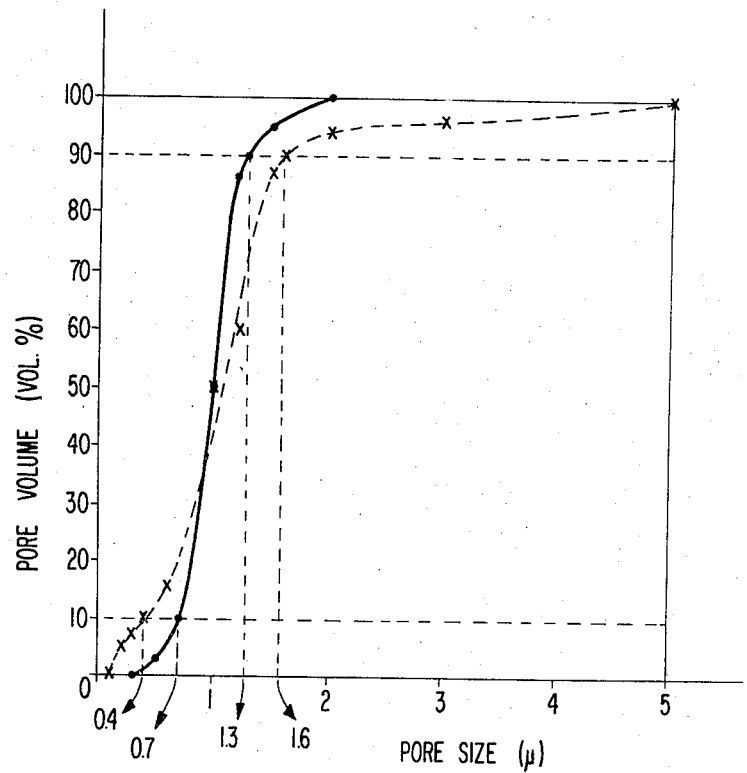

3,746,668
PROCESS FOR PREPARING A POROUS
NYLON FILM
Nobuo Hiratsuka and Masaru Horiguchi, Kanagawa, Japan, assignors to Fuji Photo Film Co., Ltd., Kanagawa, Japan
Filed Dec. 27, 1971, Ser. No. 212,371
Claims priority, application Japan, Dec. 26, 1970, 45/118,981
Int. Cl. C08j 1/26
U.S. Cl. 260—2.5 M    3 Claims

ABSTRACT OF THE DISCLOSURE

Cyclic ethers are used as gelling agents in the preparation of a finely porous nylon film. The cyclic ethers accelerate the progress of gelation and render pore size distribution uniform.

BACKGROUND OF THE INVENTION

(1) Field of the invention

This invention relates to a process of preparing a nylon film having a fine pore structure.

The finely porous nylon film of the present invention is a precise filter film intending chiefly to separate and remove fine grains and bacteria contained in liquid and gas.

(2) Description of the prior art

In the past, finely porous nylon films have been manufactured by dissolving nylon in a suitable solvent adding a gelling agent such as a lower aliphatic acid ester of a lower aliphatic alcohol, a lower aliphatic alcohol ether of glycol, boric acid, citric acid, water and the like and permitting resulting liquid to flow over onto a flat plate, whereby a thin nylon film having a fine pore structure is obtained.

However, this method is not suitable for the manufacture of precise filter films because not only is a long time required for the formation of a film due to the slow gelation, but also the pore size distribution is wide due to inhomogeneous gelation.

SUMMARY OF THE INVENTION

The object of the present invention is to provide an improved process for manufacturing nylon films having a uniform fine pore structure wherein the drawbacks of the prior art are eliminated.

We the inventors have made various investigations in order to reach a process for the efficient formation of porous nylon films with accelerated gelation wherein the product has a uniform fine pore size distribution.

Our process basically comprises dissolving nylon in an alcohol solvent, adding a cyclic ether as a gelling agent to the solution, permitting the resulting solution to flow over onto a flat support, and drying the film.

DETAILED DESCRIPTION OF THE INVENTION

According to the process of the present invention, the time required for gelation is greatly shortened, therefore the fine porous film can be efficiently manufactured. In addition, the pore size distribution has been made remarkably uniform by the present process.

As alcohol-soluble nylon resins used in the present invention, there may be mentioned, for example, CM 4000 (product of Toray Inc.), CM 8000 (product of Toray Inc.), Zytel 63 (product of Du Pont), Zytel 61 (product of Du Pont) and the like.

Nylons used in this invention are as follows:

| Composition | Molecular weight | Polymerization degree |
|---|---|---|
| Copolymer of nylon 6 and nylon 66 (CM 4000, product of Toray Inc.) | 20,000–30,000 | 100–150 |
| Copolymer of nylon 6, nylon 66 and nylon 610 (CM 8000, product of Toray Inc.) | 20,000–30,000 | 100–150 |

As solvents, there may be used, for example, methanol, ethanol, propanol, butanol and the like.

The alcohol solvent is a lower aliphatic alcohol having the following formula:

$C_nH_{2n-1}OH$, $n$ is an integer of 1 to 3.

Higher alcohols and polyalcohols are not able to be used in this invention.

As cyclic ethers which are used as the gelling agent in the present invention, there may be used, for example:

diethylene ether

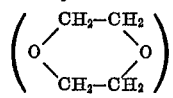

tetramethylene oxide    glycomethylene ether

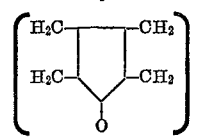 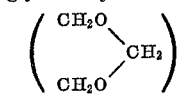

and the like.

The cyclic ether is limited to diethylene ether, tetramethyleneoxide and glycomethylene ether.

The ratio of ether:alcohol is 75:25 to 85:15.
The ratio of ether:nylon is 57:43 to 63:37.

A comparison of a finely porous film obtained by the process of the present invention with a film obtained by a prior art method gave the results shown in the following table. In the table, the rate of gelation represents the time required for the film flow and to be whitened by gelation, and the fine pore size distribution represents the pore size range in which the pore size values obtained by measurement with a mercury intrusion porosity meter are in the range of from 10 to 90% in a cumulative distribution. The pore size distribution indicates the relation between the pore size and pore volume. The figure shows the range of the pore size corresponding to 10 to 90 vol. percent of the pore volume.

Condition of gelation

Alcohol: methanol and ethanol
Cyclic ether: diethylene ether and tetramethyleneoxide
Nylon: copolymer of nylon 6 and nylon 66, and copolymer of nylon 6, nylon 66 and nylon 610
Temperature: 50° C. to 75° C. (same as the hitherto-practiced process).
Casting temperature: less than 35° C. (same as the hitherto practical process).

|  | The process of the invention | The hitherto-practiced process |
|---|---|---|
| Rate of gelation | 15 to 20 minutes | 1.5–2 hours. |
| Fine pore size | 1.0±0.3 micron | 1.0+.6 micron–0.6 micron. |

The time of gelation is 15 to 20 minutes.
The rate of gelation in the process of the invention is shorter than in the hitherto-practiced process, that is ⅙ the time.

The fine pore size distribution in the process of the invention is in the range of 0.7 to 1.3 microns, and in the hitherto-practiced process is in the range of 0.4 to 6.6 microns.

From the results shown in the table, it can be understood that the process of the present invention gives a higher rate of gelation, a higher film-forming rate and a more uniform fine pore size distribution as compared to the typical prior art process.

The present invention will now be illustrated in great detail by the following examples, but the invention is not to be limited thereby.

The nylons used in the examples were GM 4000 and CM 8000, heretofore identified. The product pore size and time and temperatures are shown in the earlier table.

EXAMPLE 1

16 parts by weight of alcohol-soluble nylon were dissolved in a solution consisting of 50 parts by weight of methanol and 23 parts by weight of water, and there was added thereto 10 parts by weight of diethylene ether as an additive. The resulting nylon solution was caused to flow onto a support having a smooth surface and dried, whereby a white finely porous nylon film was obtained. The resulting nylon film had a uniform pore size distribution.

EXAMPLE 2

20 parts by weight of alcohol-soluble nylon were dissolved in a solution consisting of 60 parts by weight of ethanol and 15 parts by weight of water, and there was added thereto 14 parts by weight of tetramethylene oxide as an additive. The resulting nylon solution was caused to flow onto a smooth metal plate, and dried, whereby a white, finely porous nylon film was obtained.

The nylon film obtained had a uniform pore size distribution.

The term "finely" in this specification defines that the pore size is uniform.

What is claimed is:

1. A process for preparing a porous nylon film with a uniform size distribution which comprises adding a cyclic ether selected from the group consisting of diethylene ether, tetramethylene oxide, and glycol methylene ether to a nylon resin solution, causing the resulting solution to flow so as to make a thin film and drying,
said ratio of ether to nylon ranging from 57:43 to 63:37

2. A process according to claim 1 wherein the nylon resin solution is an alcohol solution,
the ratio of said ether to said alcohol ranging from 75:25 to 85:15.

3. A process according to claim 2 wherein the alcohol is a lower aliphatic alcohol.

References Cited

UNITED STATES PATENTS 3,450,650   6/1969   Murata _____ 260—2.5 M

MURRAY TILLMAN, Primary Examiner

M. FOELAK, Assistant Examiner

U.S. Cl. X.R.

260—2.5 N, 30.4 N, 41